C. W. BRYAN.

Assignor, by mesne assignments, to C. W. BRYAN & J. F. TAPLEY.

Calendar.

No. 8,492. Reissued Nov. 19, 1878.

Witnesses
H. A. Chapin
Wm. H. Chapin

Clark W. Bryan
Inventor

By Chapin & Co.
Attorneys

N. PETERS, PHOTO-LITHOGRAPHER, WASHINGTON, D. C.

UNITED STATES PATENT OFFICE.

CLARK W. BRYAN, OF SPRINGFIELD, MASS., ASSIGNOR, BY MESNE ASSIGNMENTS, TO CLARK W. BRYAN AND JESSE F. TAPLEY, OF SAME PLACE.

IMPROVEMENT IN CALENDARS.

Specification forming part of Letters Patent No. 62,313, dated February 26, 1867; antedated December 11, 1866; Reissue No. 3,306, dated February 23, 1869; Reissue No. 8,492, dated November 19, 1878; application filed April 22, 1878.

*To all whom it may concern:*

Be it known that CLARK W. BRYAN, of Springfield, county of Hampden, and State of Massachusetts, has invented certain new and useful Improvements in Calendars; and that the following is a full, clear, and exact description thereof, reference being had to the accompanying drawings, making part of this specification, and to the letters of reference thereon, in which—

Figure 1:
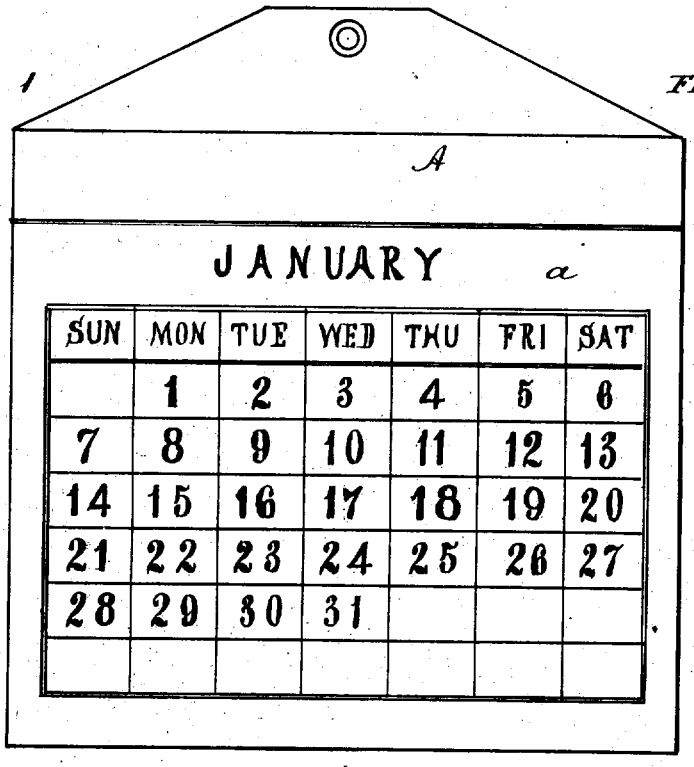
Figure 2:
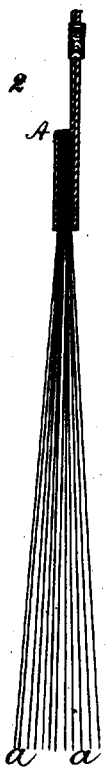
Figure 3:
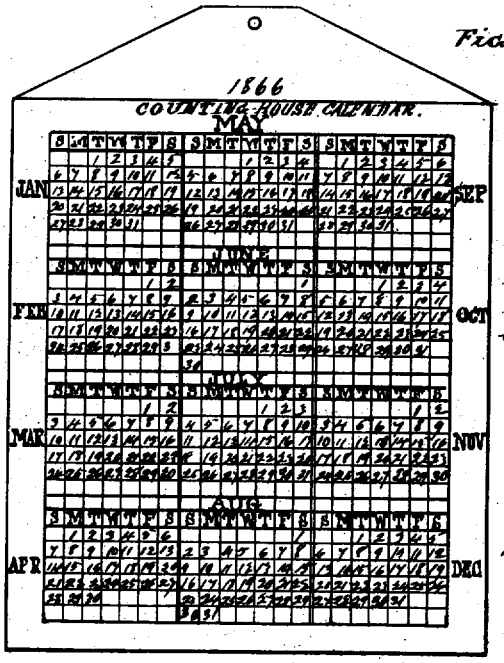

Figure 1 is a front view of the invention. Fig. 2 is a vertical transverse section, and Fig. 3 is a rear view of the same.

This invention relates to the calendar commonly used for office purposes; and consists in arranging together sheets or pieces of paper, each having printed thereon the month, certain days of the month, corresponding days of the week, &c., and in so attaching said sheets together that the front sheet, when no longer required, may be easily separated and removed from the sheets arranged in proper succession of time behind it, leaving the next sheet exposed, and so on to the last sheet.

That others may be able to make and use the invention, we will describe its construction and use.

In the drawings, *a a* represent the sheets of paper, each having one of the months printed thereon, together with the day of the month and day of the week, and they are attached together, preferably at or near the upper edge, and, if desired, may be secured to a head-piece, A, which may be made of card-board or any other convenient and sufficiently strong material, by which the sheets may be hung up for use.

When the month has expired which the outside sheet represents, said sheet is easily and quickly removed. By this arrangement the month, day of the month, and day of the week may be printed quite large, so that they may be seen at a distance, while the calendar is still in a compact form.

Those portions of the sheets, upon their faces, not occupied by figures or other printed characters, may have business-cards printed thereon, or other matter, thus furnishing an excellent medium of advertising. The last or back sheet may have printed upon the back side the counting-house calendar represented in Fig. 3, in which arrangement is included all the months of the year, days of the month, and days of the week. This is very convenient, as it is quite often desirable to refer to a month which is past, the sheet representing that month having been removed.

It is obvious that various methods of attaching the sheets may be practiced without in the least departing from the principle of operation, the object of the invention being to attach small sheets together which have previously been printed for a calendar in suitably large characters, in such a manner as to be able to remove the outside sheet easily and quickly when desirable.

Having therefore described the invention, what we claim as new, and desire to secure by Letters Patent, is—

1. A calendar constructed of several superposed printed sheets, attached together at one edge, whereby the several sheets may be successively and easily removed, substantially as and for the purpose set forth.

2. A calendar constructed of several printed sheets attached to a head-piece, substantially as and for the purpose set forth.

3. A calendar constructed of several superposed printed sheets attached to a head-piece, and having attached to the last of said sheets a counting-house calendar, substantially as herein described and specified.

CLARK W. BRYAN,
JESSE F. TAPLEY,
*Assignees of Clark W. Bryan.*

Witnesses:
H. A. CHAPIN,
WM. H. CHAPIN.